United States Patent
Kim et al.

(10) Patent No.: US 12,451,705 B2
(45) Date of Patent: Oct. 21, 2025

(54) METHOD OF BATTERY BALANCING AND BATTERY SYSTEM PROVIDING THE SAME

(71) Applicant: LG ENERGY SOLUTION, LTD., Seoul (KR)

(72) Inventors: Jin Man Kim, Daejeon (KR); Kiwook Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 882 days.

(21) Appl. No.: 17/697,584

(22) Filed: Mar. 17, 2022

(65) Prior Publication Data

US 2022/0278534 A1 Sep. 1, 2022

(30) Foreign Application Priority Data

Feb. 25, 2021 (KR) .................. 10-2021-0025894

(51) Int. Cl.
*H02J 7/00* (2006.01)
*G01R 31/396* (2019.01)
*H01M 10/42* (2006.01)
*H01M 10/44* (2006.01)

(52) U.S. Cl.
CPC .......... *H02J 7/0024* (2013.01); *G01R 31/396* (2019.01); *H01M 10/425* (2013.01); *H01M 10/441* (2013.01); *H02J 7/0063* (2013.01); *H02J 7/007182* (2020.01); *H01M 2010/4271* (2013.01)

(58) Field of Classification Search
CPC ...... H02J 7/0024; H02J 7/0014; H02J 7/0063; G01R 31/396; H01M 10/425; H01M 10/441

USPC ......................................................... 320/117
See application file for complete search history.

(56) References Cited

U.S. PATENT DOCUMENTS

| | | | | |
|---|---|---|---|---|
| 9,356,467 B2 * | 5/2016 | Van Lammeren | .... | H02J 7/0024 |
| 2008/0180061 A1 * | 7/2008 | Koski | .............. | H01M 10/441 |
| | | | | 320/136 |
| 2013/0293006 A1 * | 11/2013 | Kang | ..................... | H02J 1/10 |
| | | | | 307/9.1 |

(Continued)

FOREIGN PATENT DOCUMENTS

| | | |
|---|---|---|
| JP | 6183709 B2 | 8/2017 |
| JP | 2019-193487 A | 10/2019 |

(Continued)

*Primary Examiner* — Nathaniel R Pelton
(74) *Attorney, Agent, or Firm* — Birch, Stewart, Kolasch & Birch, LLP (57) ABSTRACT

A method of voltage balancing among a plurality of battery modules connected in series and supplying power to an external device, and a battery system providing the same, and the battery system of the present invention includes: a battery pack including a plurality of battery modules; a switching circuit connecting the plurality of battery modules in series or in parallel; and a battery management system (BMS) controlling the switching circuit so as to connect the plurality of battery modules in series in a discharge mode to supply power from the battery pack to an external device, a charge mode to charge the battery pack by receiving the power from the external device, and a module balancing mode to charge the plurality of battery modules with the power applied from the external device until a voltage difference is a predetermined reference value or less.

15 Claims, 6 Drawing Sheets

(56) References Cited

U.S. PATENT DOCUMENTS

| | | | |
|---|---|---|---|
| 2014/0312850 A1* | 10/2014 | Song | H01M 10/4207 320/134 |
| 2015/0194707 A1* | 7/2015 | Park | H01M 10/425 429/61 |
| 2021/0249875 A1* | 8/2021 | Morimoto | H02J 7/0024 |
| 2022/0140635 A1* | 5/2022 | Hines | H02J 7/007194 320/112 |
| 2022/0263324 A1* | 8/2022 | Sun | H02J 7/0016 |

FOREIGN PATENT DOCUMENTS

| | | |
|---|---|---|
| JP | 2021-16267 A | 2/2021 |
| KR | 10-2014-0128468 A | 11/2014 |
| KR | 10-1497602 B1 | 3/2015 |
| KR | 10-2015-0081731 A | 7/2015 |
| KR | 10-2020-0054583 A | 5/2020 |

* cited by examiner

METHOD OF BATTERY BALANCING AND BATTERY SYSTEM PROVIDING THE SAME

CROSS-REFERENCE TO RELATED APPLICATION

This application claims priority to and the benefit of Korean Patent Application No. 10-2021-0025894 filed in the Korean Intellectual Property Office on Feb. 25, 2021, the entire contents of which are incorporated herein by reference.

BACKGROUND OF THE INVENTION

(a) Field of the Invention

The present invention relates to a method of voltage balancing among a plurality of battery modules connected in series and supplying power to an external device, and a battery system providing the same.

(b) Description of the Related Art

Unlike a primary battery which is disabled to be reused, a secondary battery which is changed and reusable after being used is used for an energy storage system (ESS), an electric vehicle, etc, which charge and discharge energy. In particular, since the ESS and the electric vehicle charges or discharges large-scale power, large amounts of energy storage devices are required.

The large amount of energy storage device includes at least one battery pack, and the battery pack includes a plurality of battery modules connected in series and/or in parallel. In this case, each battery module may be constituted by connecting a plurality of battery cells as a minimum unit in series.

Meanwhile, as charging and discharging the battery pack are repeated, a voltage deviation among the plurality of battery modules constituting the battery pack can be generated. Further, when a defect occurs in a predetermined battery module constituting the battery pack and the corresponding battery module needs to be replaced, a voltage deviation can be generated between a pre-installed battery module and a new installed battery module. When the voltage deviation is generated among the plurality of battery modules, some battery modules are overcharged in a charge stage or some battery modules are over discharged in a discharge stage to cause the battery pack to be degraded and shortening a life span.

In the related art, a battery module to be replaced is installed in the battery pack after being charged or discharged so as to obtain a voltage balance with the pre-installed battery module, and this as a very cumbersome task is not efficient.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method of a voltage balance among a plurality of battery modules and a battery system providing the same, which charge the plurality of battery modules in parallel by using an external device (e.g., a power conversion system) when a voltage imbalance occurs among the plurality of battery modules included in a battery pack.

An exemplary embodiment of the present invention provides a battery system including: a battery pack including a plurality of battery modules; a switching circuit connecting the plurality of battery modules in series or in parallel; and a battery management system (BMS) controlling the switching circuit so as to connect the plurality of battery modules in series in a discharge mode to supply power from the battery pack to an external device and a charge mode to charge the battery pack by receiving the power from the external device, in which the BMS controls the switching circuit so as to connect the plurality of battery modules in parallel in a module balancing mode to charge the plurality of battery modules with the power applied from the external device until a voltage difference among the plurality of battery modules is a predetermined reference value or less.

The switching circuit may include a serial switch connected between an anode of a predetermined battery module among the plurality of battery modules and a cathode of another battery module among the plurality of battery modules adjacent the predetermined battery module, a plurality of first parallel switches including a first end connected to an anode of the plurality of battery modules, a plurality of second parallel switches including a first end connected to a cathode of the plurality of battery modules, a first main relay connected between a first contact point and a first output terminal to which second ends of the plurality of first parallel switches are connected, a balancing relay connected between a second contact point and a second output terminal to which second ends of the plurality of second parallel switches are connected, and a second main relay connected between a cathode of the battery pack and the second output terminal.

The BMS may turn on the serial switch, and turn off the plurality of first parallel switches and the plurality of second parallel switches to connect the plurality of battery modules in series, and turn on the first main relay and the second main relay, and turn off the balancing relay to electrically connect the plurality of battery modules connected in series and the external device, in the discharge mode and the charge mode.

The BMS may turn off the serial switch, and turn on the plurality of first parallel switches and the plurality of second parallel switches to connect the plurality of battery modules in parallel, and turn on the first main relay and the balancing relay, and turn off the second main relay to electrically connect the plurality of battery modules connected in parallel and the external device, in the module balancing mode.

When the voltage difference among the plurality of battery modules is lowered to the predetermined reference value or less by changing by the external device, the BMS may electrically isolate the plurality of battery modules connected in parallel and the external device, and control the switching circuit so that the connection of the plurality of battery modules is changed from a parallel connection to a serial connection.

The external device may include a power conversion system (PCS) adjusting a power amount supplied according to a control of the BMS.

Another exemplary embodiment of the present invention provides a method of voltage balancing among a plurality of battery modules connected in series in a discharge mode to supply power from a battery pack to an external device and a charge mode to receive the power from the external device to charge the battery pack, which includes: judging whether an entrance condition of a module balancing mode of voltage balancing among the plurality of battery modules is satisfied; controlling a switching circuit so as to connect the plurality of battery modules in parallel when the entrance condition is satisfied according to the judgment result; electrically connecting the plurality of battery modules connected in parallel and the external device to charge the plurality of battery modules connected in parallel; and terminating the module balancing mode when a voltage difference among the plurality of battery modules is lowered to a predetermined reference value or less by the charging.

The entrance condition of the module balancing mode may include a case where a difference value between a maximum module voltage and a minimum module voltage among module voltages of the plurality of battery modules exceeds the predetermined reference value.

In the controlling of the switching circuit so as to connect the plurality of battery modules in parallel, the switching circuit may be controlled to turn off a serial switch connected between an anode of a predetermined battery module among the plurality of battery modules and a cathode of another battery module among the plurality of battery modules adjacent to the predetermined battery module, and turn on a plurality of first parallel switches including a first end is connected to an anode of the plurality of battery modules and a plurality of second parallel switches including a first end connected to a cathode of the plurality of battery modules to connect the plurality of battery modules in parallel.

In the charging of the plurality of battery modules connected in parallel, the switching circuit may be controlled to turn on a first main relay connected between a first contact point and a first output terminal to which second ends of the plurality of first parallel switches are connected and a balancing relay connected between a second contact point and a second output terminal to which second ends of the plurality of second parallel switches are connected, and turn off a second main relay connected between a cathode of the battery pack and the second output terminal to electrically connect the plurality of battery modules connected in parallel and the external device.

In the terminating of the module balancing mode, the switching circuit may be controlled to electrically isolate the plurality of battery modules connected in parallel and the external device and change the connection of the plurality of battery modules from a parallel connection to a serial connection.

In the terminating of the module balancing mode, when a difference value between a maximum module voltage and a minimum module voltage among module voltages of the plurality of battery modules is lowered to the predetermined reference value or less, the module balancing mode may be terminated.

According to exemplary embodiments of the present invention, the plurality of battery modules are connected in parallel, and then charged to adjust a voltage balance of all battery modules included in the battery pack.

According to the exemplary embodiments of the present invention, even when a predetermined battery module is replaced among the plurality of battery modules, a new inserted battery module can be installed without adjusting the voltage balance with a pre-installed battery module before being installed to facilitate maintenance of the battery pack.

According to the exemplary embodiments of the present invention, there is an effect that a stability is increased by preventing degradation of the battery pack, and the life-span of the battery packet can be extended.

DETAILED DESCRIPTION OF THE EMBODIMENTS

Hereinafter, exemplary embodiments disclosed in this specification will be described in detail with reference to the accompanying drawings and the same or similar components are denoted by the same or similar reference numerals, and duplicated description thereof will be omitted. Suffixes "module" and/or "unit" for components used in the following description are given or mixed in consideration of easy preparation of the present disclosure only and do not have their own distinguished meanings or roles. Further, in describing an embodiment disclosed in the present disclosure, a detailed description of related known technologies will be omitted if it is determined that the detailed description makes the gist of the embodiment of the present disclosure unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

Terms including an ordinary number, such as first and second, are used for describing various elements, but the elements are not limited by the terms. The terms are used only to discriminate one element from another element.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Figure 1:
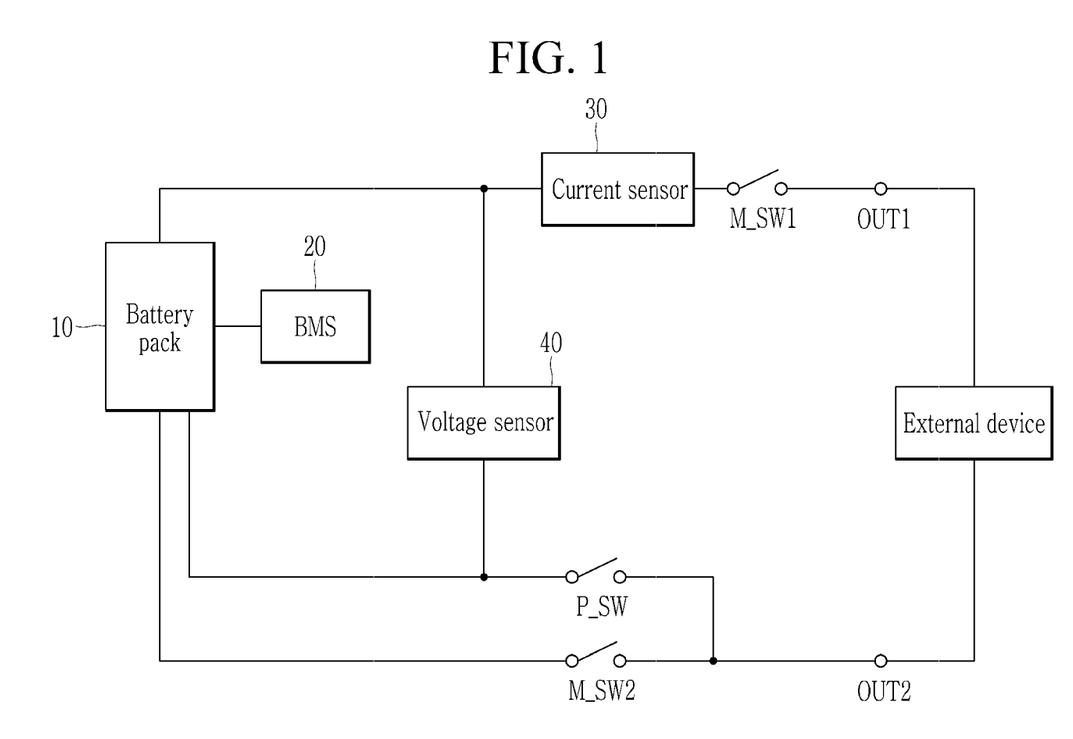
FIG. 1 illustrates a battery system according to an exemplary embodiment.
Figure 2:
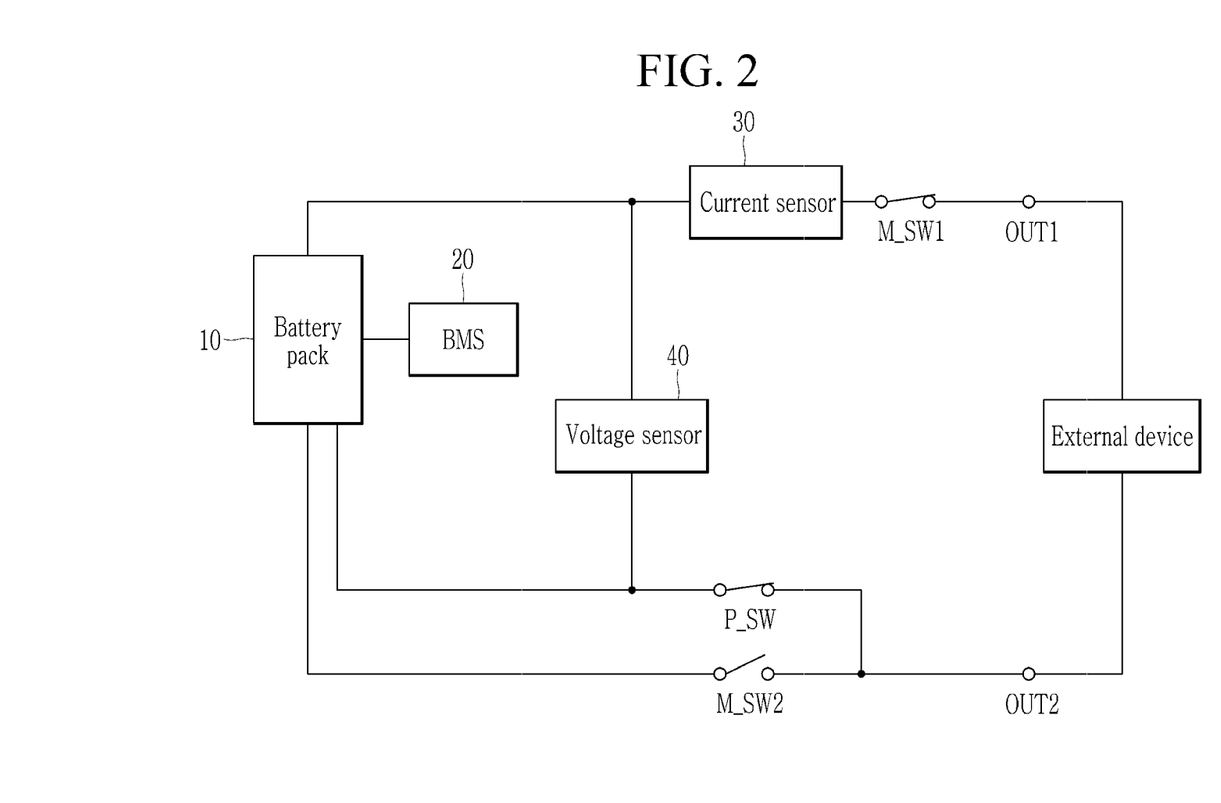
FIG. 2 is a diagram illustrating on/off of a relay in a module balancing mode of FIG. 1.
Figure 3:
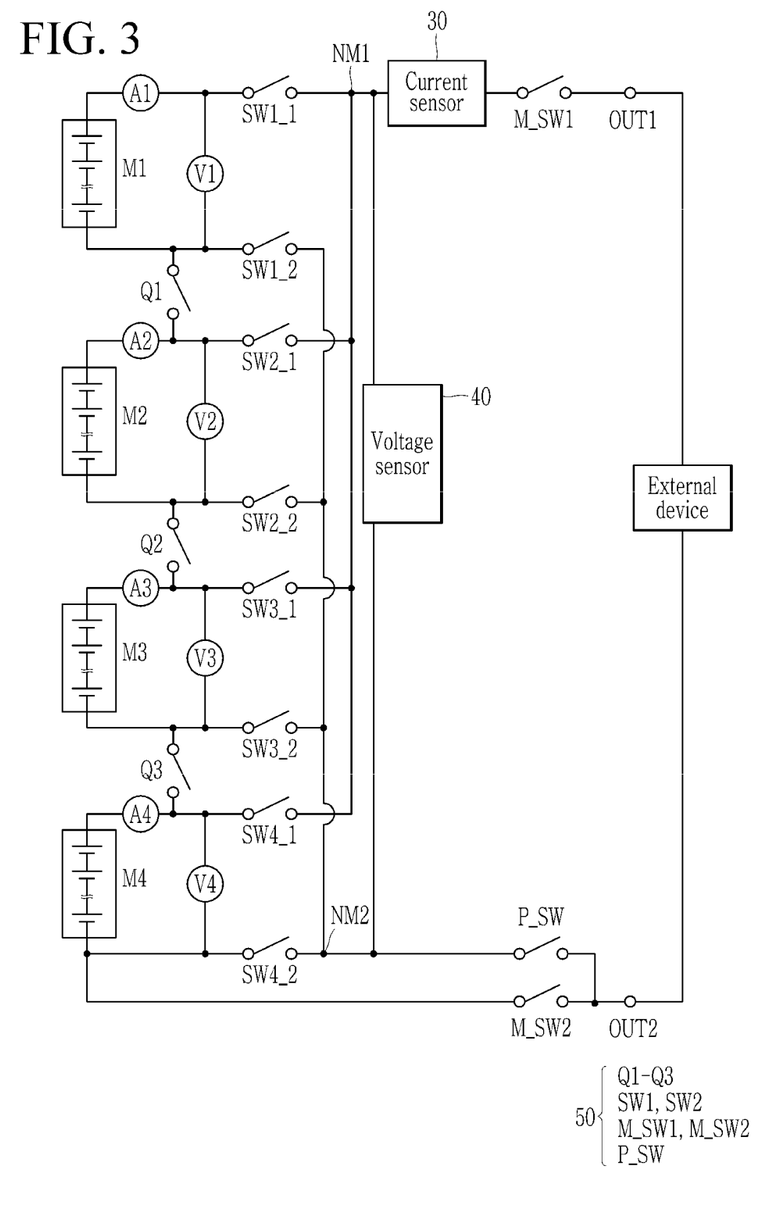
FIG. 3 is a diagram for specifically describing a switching circuit provided inside a battery pack of FIG. 1.
Figure 4:
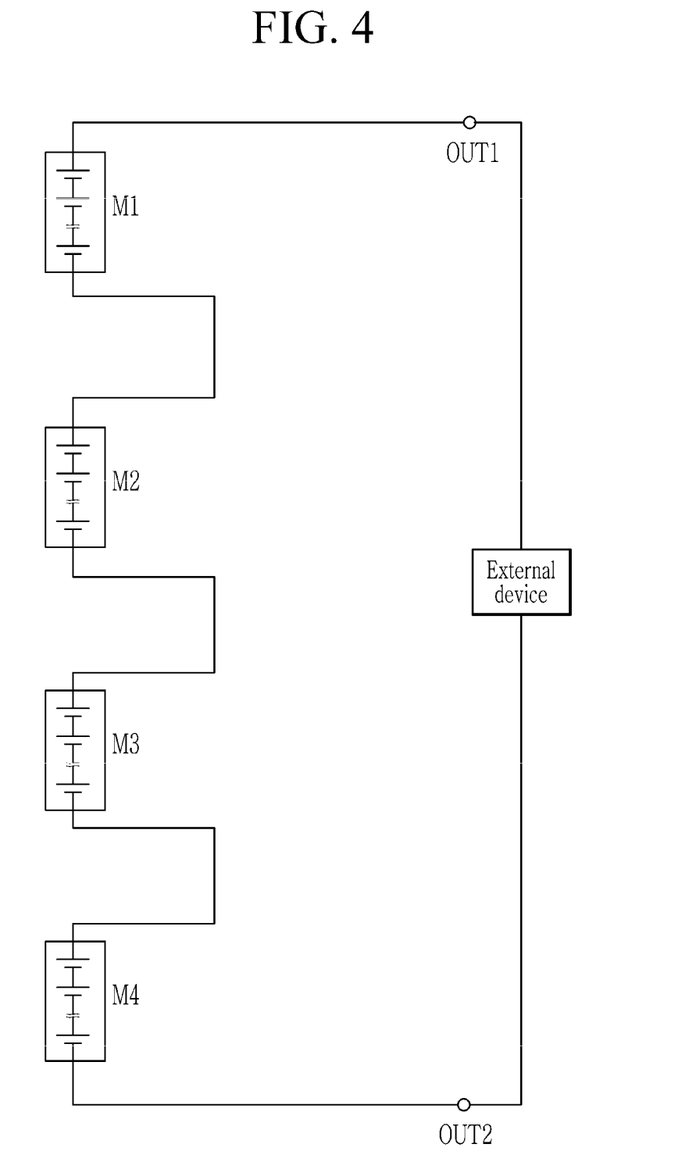
FIG. 4 is a diagram illustrating a serial connection of a plurality of battery modules in charge and discharge modes by the switching circuit of FIG. 3.
Figure 5:
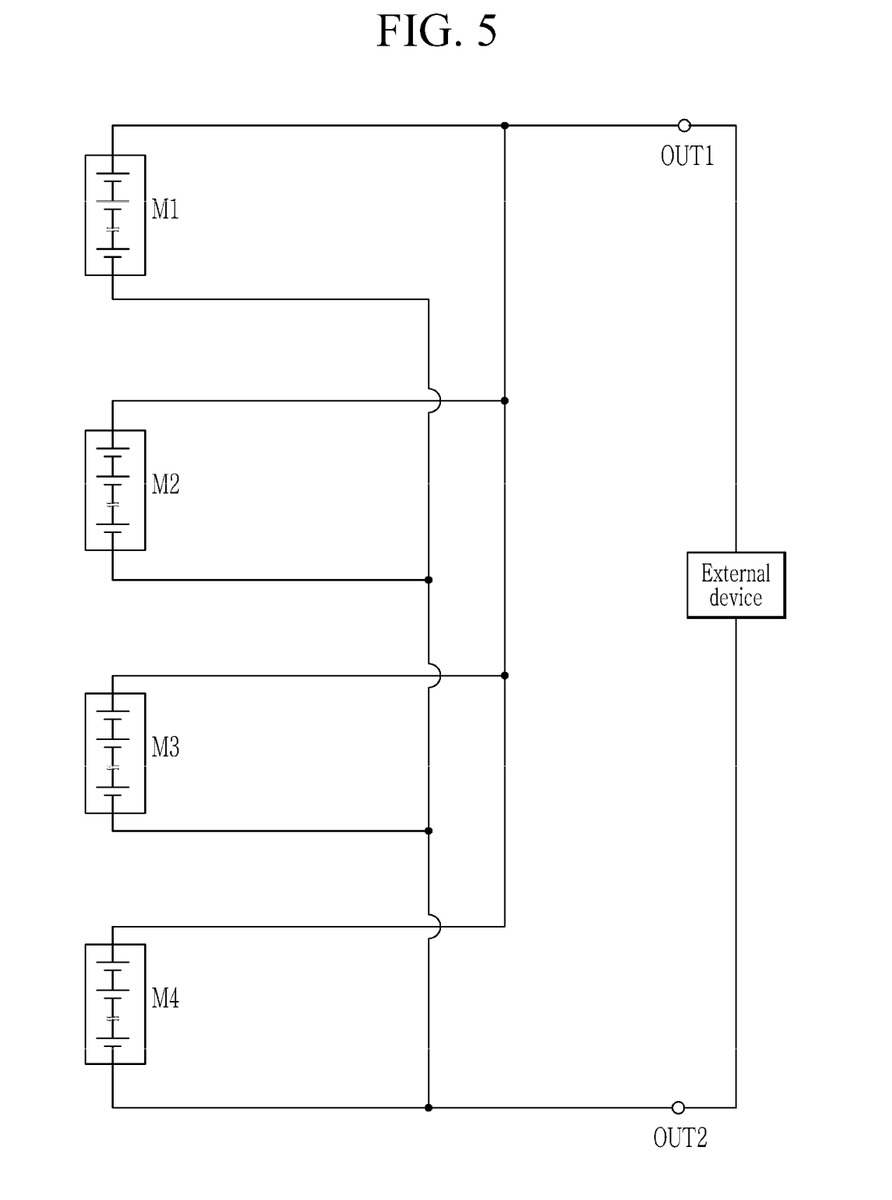
FIG. 5 is a diagram illustrating a parallel connection of the plurality of battery modules in the module balancing mode by the switching circuit of FIG. 3.

FIG. 1 illustrates a battery system according to an exemplary embodiment, FIG. 2 is a diagram illustrating on/off of a relay in a module balancing mode of FIG. 1, FIG. 3 is a diagram for specifically describing a switching circuit provided inside a battery pack of FIG. 1, FIG. 4 is a diagram illustrating a serial connection of a plurality of battery modules in charge and discharge modes by the switching circuit of FIG. 3, and FIG. 5 is a diagram illustrating a parallel connection of the plurality of battery modules in the module balancing mode by the switching circuit of FIG. 3.

Referring to FIGS. 1 and 3, the battery system 1 includes a battery pack 10, a battery management system (BMS) (20), a current sensor 30, a voltage sensor 40, and a switching circuit 50.

The battery pack 10 includes a plurality of battery modules M1 to M4, and each battery module M include a plurality of battery cells connected in series. The battery cell may be a chargeable secondary battery. In FIG. 3, it is illustrated that the battery pack 10 includes four battery modules M1 to M4, but is not limited thereto, and the number of battery modules M and the number of battery cells included in each battery module M may be changed according to a design.

In a charge mode in which the battery pack 10 is charged with power supplied from an external device or a discharge mode in which the battery pack 10 supplies the power to the external device, the plurality of battery modules M1 to M4 may be connected in series by the switching circuit 50. In this case, the external device may be a load such as a charging device or a motor of a vehicle.

According to an exemplary embodiment, in a module balancing mode in which the battery pack 10 charges the plurality of battery modules M1 to M4 with the power supplied from the external device to reduce a voltage deviation, the plurality of battery modules M1 to M4 may be connected in parallel by the switching circuit 50. In this case, the external device may be a power conversion system (PCS).

The power conversion system (PCS) may convert the power into a power amount and a power form (AC or DC) required in the battery system when the power is input into or output from the battery system. That is, the power conversion system (PCS) may operate as the charging device or a discharging device, and convert the power according to a control of the BMS 20 and input or output the converted power into or from the battery system 1. According to an exemplary embodiment, the power conversion system (PCS) may convert the power supplied from the outside into a power amount and a power form suitable for reducing the voltage deviation among the plurality of battery modules M1 to M4 according to the control of the BMS 20, and supply the converted power to the battery system.

In FIG. 1, the battery pack 10 is connected between both output terminals OUT1 and OUT2 of the battery system 1. The current sensor 30 and a first main relay M_SW1 are connected in series between an anode of the battery pack 10 and a first output terminal OUT1. A second main relay M_SW2 and a balancing relay P_SW are connected in parallel between a cathode of the battery pack 10 and a second output terminal OUT 2. In order to detect both-terminal voltage of the battery pack 10 while the first main relay M_SW1 and the balancing relay P_SW are turned on, the voltage sensor 40 may be connected between one end (e.g., a first end) of the first main relay M_SW1 and one end (e.g., a second end) of the balancing relay P_SW. In this case, the first output terminal OUT1 may be the anode of the battery system 1 and the second output terminal OUT2 may be the cathode of the battery system 1. Components illustrated in FIG. 1 and a connection relationship between the components are examples, and the present invention is not limited thereto.

Referring to FIG. 2, in the module balancing mode according to an exemplary embodiment, the first main relay M_SW1 and the balancing relay P_SW are turned on, and the second main relay M_SW2 is turned off. Further, in the charge mode and the discharge mode, the balancing relay P_SW may be turned off, and the first main relay M_SW1 and the second main relay M_SW2 may be turned on. Hereinafter, in FIGS. 3 to 5, the operation of the switching circuit 50 and the connection of the plurality of battery modules M1 to M4 in the charge mode, the discharge mode, and the module balancing mode will be described in detail.

The BMS 20 may determine whether to enter the module balancing mode based on a voltage value and a current value measured for each of the plurality of battery modules M1 to M4.

For example, when a voltage difference value (hereinafter, referred to as a voltage difference) among the plurality of battery modules M1 to M4 is larger than a predetermined reference value, the BMS 20 may judge that a voltage imbalance among the plurality of battery modules M1 to M4 occurs and determine entering the module balancing mode.

As another example, the BMS 20 may predict a state of charge (SOC) based on the voltage value and/or the current value of each of the plurality of battery modules M1 to M4, and when an SOC difference value (hereinafter, referred to as an SOC difference) among the plurality of battery modules M1 to M4 is larger than a predetermined reference value, the BMS 20 may judge that an SOC imbalance among the plurality of battery modules M1 to M4 occurs and determine entering the module balancing mode. In this case, a method for predicting the SOC based on the voltage value and/or the current value may include various known methods in the related art, e.g., a current integration method of predicting the SOC by adding a flow of current per hour, a method for predicting the SOC based on open circuit voltage (OCV), etc.

When entering the module balancing mode is determined, the BMS 20 controls the switching circuit 50 so that the plurality of battery modules M1 to M4 are connected in parallel. When the plurality of battery modules M1 to M4 connected in parallel are charged with the power input through the power conversion system (PCS) and the voltage difference among the plurality of battery modules M1 to M4 is thus lowered to the predetermined reference value or less, the BMS 20 may control the switching circuit 50 so that the plurality of battery modules M1 to M4 are connected in series. That is, when the module balancing mode is terminated, a connection structure of the plurality of battery modules M1 to M4 connected in parallel may be changed to a serial connection.

The current sensor 30 is connected to a current path between the battery pack 10 and the external device in series. The current sensor 30 may measure battery current which flows on the battery pack 10, i.e., charge current, discharge current, and module balancing current, and transfer a measurement result to the BMS 20. In this case, the module balancing current may correspond to an aggregation value of current (hereinafter, referred to as module current) applied to each battery module M in the module balancing mode.

Referring to FIG. 3, the battery system 1 may further include a plurality of current units A1 to A4 connected to the current path between the plurality of battery modules M1 to M4 and the external device in series. The current unit A may measure the module current which flows on the battery module M and transfer the measurement result to the BMS 20.

The voltage sensor 40 may measure the both-terminal voltage of the plurality of battery modules M1 to M4 connected in parallel, and transfer the measurement result to the BMS 20, in the module balancing mode. That is, voltages of the plurality of respective battery modules M1 to M4 connected in parallel and charged are equal to each other within a predetermined error range, and the BMS 20 may terminate the module balancing mode when the voltage measured by the voltage sensor 40 reaches a predetermined voltage.

Referring to FIG. 3, the battery system 1 may further include a plurality of voltage units V1 to V4 connected to the plurality of battery modules M1 to M4, respectively in parallel. The voltage unit V may measure a module voltage which is a both-terminal voltage of the battery module M and transfer the measurement result to the BMS 20.

The switching circuit 50 may connect the plurality of battery modules M1 to M4 in series or in parallel by the control of the BMS 20. For example, in the discharge mode in which the battery pack 10 outputs the power to the external device and the charge mode in which the power is input from the external device to charge the battery pack 10, the switching circuit 50 may connect the plurality of battery modules M1 to M4 in series by the control of the BMS 20. As another example, in the module balancing mode in which the plurality of battery modules M1 to M4 are charged with power input from the external device until the voltage difference among the plurality of battery modules M1 to M4 becomes the predetermined reference value or less, the switching circuit 50 may connect the plurality of battery modules M1 to M4 in parallel by the control of the BMS 20.

Referring to FIG. 3, the switching circuit 50 may include a serial switch Q, a first parallel switch SW_1, a second parallel switch SW_2, the first main relay M_SW1, the second main relay M_SW2, and the balancing relay P_SW.

The serial switch Q is connected between the anode of a predetermined battery module and the cathode of a battery module adjacent thereto. When the serial switch Q is turned on by the control of the BMS 20, the serial switch Q may connect the plurality of battery modules M1 to M4 in series. In FIG. 3, the switching circuit 50 includes three serial switches Q1 to Q3 in order to connect four battery modules M1 to M4 in series. That is, the switching circuit 50 may include at least one serial switch Q in order to connect the plurality of battery modules M1 to M4 in series.

One end (e.g., a first end) of the first parallel switch SW_1 is connected to the anode of the battery module M and the other end (e.g., a second end) is connected to the first output terminal OUT1 through the first main relay M_SW1. Referring to FIG. 3, the switching circuit 50 may include a plurality of first parallel switches SW1_1, SW2_1, SW3_1, and SW4_1 (hereinafter, referred to as SWN_1) of which one end (e.g., a first end) is connected to the anode of each of the plurality of battery modules M1 to M4. Further, the other end (e.g., a second end) of each of the plurality of first parallel switches SWN_1 is connected to a first contact point NM1.

One end (e.g., a first end) of the second parallel switch SW_2 is connected to the cathode of the battery module M and the other end (e.g., a second end) is connected to the second output terminal OUT2 through the balancing relay P_SW. Referring to FIG. 3, the switching circuit 50 may include a plurality of second parallel switches SW1_2, SW2_2, SW3_2, and SW4_2 (hereinafter, referred to as SWN_2) of which one end (e.g., a first end) is connected to the cathode of each of the plurality of battery modules M1 to M4. Further, the other end (e.g., a second end) of each of the plurality of second parallel switches SWN_2 is connected to a second contact point NM2.

Referring to FIGS. 3 and 4, when the plurality of first parallel switches SWN_1 and the plurality of second parallel switches SWN_2 are turned off, and the plurality of serial switches Q1 to Q3 are turned on, the plurality of battery modules M1 to M4 are connected in series. In addition, when the first main relay M_SW1 and the second main relay M_SW2 are turned on, and the balancing relay P_SW is turned off, the plurality of battery modules M1 to M4 connected in series may be electrically connected to the external device.

Referring to FIGS. 3 and 5, when the plurality of first parallel switches SWN_1 and the plurality of second parallel switches SWN_2 are turned on, and the plurality of serial switches Q1 to Q3 are turned off, the plurality of battery modules M1 to M4 are connected in parallel. In addition, when the first main relay M_SW1 and the balancing relay P_SW are turned on, and the second main relay M_SW2 is turned off, the plurality of battery modules M1 to M4 connected in parallel may be electrically connected to the external device.

Figure 6:
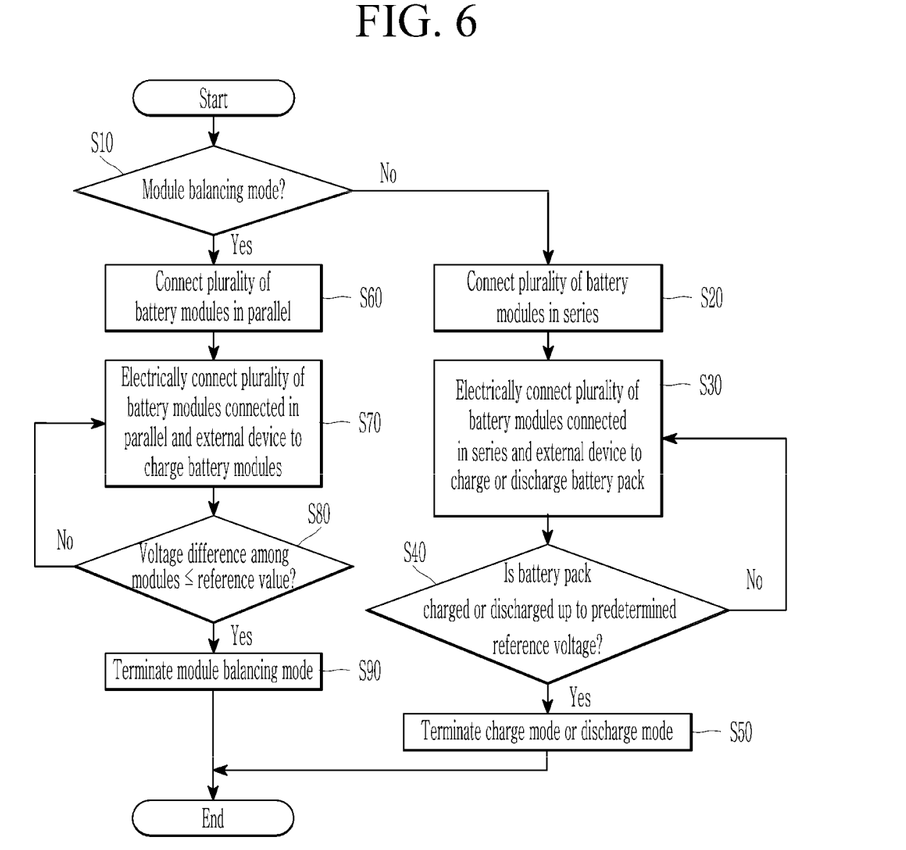
FIG. 6 is a flowchart for describing a module balancing method according to an exemplary embodiment.

FIG. 6 is a flowchart for describing a module balancing method according to an exemplary embodiment.

Hereinafter, referring to FIGS. 1 to 6, a balancing method of reducing a voltage imbalance among a plurality of battery modules and a battery system providing the same will be described.

Referring to FIG. 6, first, a BMS 20 judges whether an entrance condition of a module balancing mode is satisfied (S10).

The entrance condition of the module balancing mode may include replacement of a new battery module M or a case where a voltage difference among a plurality of battery modules M1 to M4 exceeds a predetermined reference value. That is, when a predetermined battery module M is replaced, the BMS 20 may judge that the entrance condition of the module balancing mode is satisfied. In another case, when the predetermined battery module M is replaced, the BMS 20 may compare a voltage difference among the modules M1 to M4 with the predetermined reference value, and judge whether to enter the module balancing mode according to a result thereof. In yet another case, even though an event in which the battery module M is replaced does not occur, the BMS 20 may compare the voltage difference among the battery modules M1 to M4 with the predetermined reference value every predetermined period T, and judge whether to enter the module balancing mode according to a result thereof.

Referring to FIG. 3, the BMS 20 may calculate the voltage difference or an SOC difference among the plurality of battery modules M1 to M4 based on a module voltage and/or a module current of each of the plurality of battery modules M1 to M4. When the voltage difference or the SOC difference exceeds a predetermined reference value, the BMS 20 may judge that a voltage imbalance occurs among the plurality of battery modules M1 to M4 and judge that the entrance condition of the module balancing mode is satisfied. In this case, the BMS 20 may receive the module voltage from a plurality of voltage units V1 to V4 and receive the module current from a plurality of current units A1 to A4.

For example, when the module values of the plurality of battery modules M1 to M4 are 2 V, 3 V, 4 V, and 5 V, respectively, the BMS 20 may calculate a voltage difference (3V=5V−2V) between a maximum module voltage (5 V) and a minimum module voltage (2 V), and compare the voltage difference (3 V) with a predetermined reference value (e.g., 1 V). Then, the BMS 20 may judge that the voltage difference (3V) exceeds the predetermined reference value (1 V), and determine entering the module balancing mode.

As another example, when the SOC values of the plurality of battery modules M1 to M4 are 60%, 65%, 70%, and 75%, respectively, the BMS 20 may calculate an SOC difference (15%=75%−60%) between a maximum SOC value (75%) and a minimum SOC value (60%), and compare the SOC difference (15%) with a predetermined reference value (e.g., 10%). Then, the BMS 20 may judge that the SOC difference (15%) exceeds the predetermined reference value (10%), and determine entering the module balancing mode. In this case, the BMS 20 may predict the SOC value of each of the plurality of battery modules M1 to M4 by various known methods in the related art based on the module voltage and/or the module current.

Next, when the entrance condition of the module balancing mode is not satisfied (S10, NO), the BMS 20 connects the plurality of battery modules M1 to M4 in series (S20). When the plurality of battery modules M1 to M4 are connected in series, the BMS 20 may maintain a previous connection of the plurality of battery modules M1 to M4

Next, the BMS 20 electrically connects the plurality of battery modules M1 to M4 connected in series and an external device according to a charge mode or a discharge mode to charge or discharge a battery pack 10 (S30). Next, when it is judged that the charge mode or the discharge mode is terminated according to a predetermined condition (S40, Yes), the BMS 20 terminates the charge mode or the discharge mode (S50).

Next, when the entrance condition of the module balancing mode is satisfied (S10, Yes), the BMS 20 connects the plurality of battery modules M1 to M4 in parallel (S60).

Referring to FIG. 3, the BMS 20 controls a plurality of first parallel switches SWN_1 and a plurality of second parallel switches SWN_2 to be turned on, and a plurality of serial switches Q1 to Q3 to be turned off. Then, the plurality of battery modules M1 to M4 are connected in parallel.

Next, the BMS 20 electrically connects the plurality of battery modules M1 to M4 connected in parallel and the external device to charge the plurality of battery modules M1 to M4 (S70).

Referring to FIG. 3, the BMS 20 controls the first main relay M_SW1 and the balancing relay P_SW to be turned on, and the second main relay M_SW2 to be turned off. Then, as illustrated in FIG. 5, the plurality of battery modules M1 to M4 connected in parallel may be electrically connected to the external device. In this case, the external device may be a power conversion system (PCS).

Next, the BMS 20 judges whether the voltage difference among the plurality of battery modules M1 to M4 is the predetermined reference value or less (S80).

The predetermined reference value as a voltage value at a degree which may be regarded as a voltage balance among the plurality of battery modules M1 to M4 may be set by a designer.

For example, it is assumed that before entering the module balancing mode, when the module values of the plurality of battery modules M1 to M4 are 2 V, 3 V, 4 V, and 5V, respectively, and the voltage difference (3V=5V−2V) between the maximum module voltage (5 V) and the minimum module voltage (2 V) exceeds the predetermined reference value (1 V). Thereafter, the plurality of battery modules M1 to M4 may be connected in parallel (S60), charging is performed through the external device (S70), and then the module voltages of the plurality of battery modules M1 to M4 reach 4.9 V, 5 V, 5.1 V, 5.2 V, respectively. Then, the BMS 20 may judge that a voltage difference (0.3 V=5.2 V−4.9 V) between a maximum module voltage (5.2 V) and a minimum module voltage (4.9 V) is lowered to a predetermined reference value (1 V) or less after charging Next, when the voltage difference among the plurality of battery modules M1 to M4 exceeds the predetermined reference value (S80, No), the BMS 20 continuously charges the plurality of battery modules M1 to M4 (S70).

Next, when the voltage difference among the plurality of battery modules M1 to M4 is lowered to the predetermined reference value or less (S80, Yes), the BMS 20 terminates the module balancing mode (S90)

Specifically, the BMS 20 controls the external device to stop charging the plurality of battery modules M1 to M4 and controls the switching circuit 50 so as to electrically isolate the plurality of battery modules M1 to M4 connected in parallel and the external device. Further, the BMS 20 may control the switching circuit 50 so that the connection of the plurality of battery modules M1 to M4 is changed from a parallel connection to a serial connection. That is, the plurality of battery modules M1 to M4 are in parallel connected only in the module balancing mode, and when the module balancing mode is terminated, the plurality of battery modules M1 to M4 may be connected in series again.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A battery system comprising:
a battery pack including a plurality of battery modules;
a switching circuit connecting the plurality of battery modules in series or in parallel;
a battery management system (BMS) configured to control the switching circuit so as to connect the plurality of battery modules in series in a discharge mode to supply power from the battery pack to an external device and in a charge mode to charge the battery pack by receiving the power from the external device;
a plurality of first parallel switches including a first end connected to an anode of the plurality of battery modules; and
a plurality of second parallel switches including a first end connected to a cathode of the plurality of battery modules,
wherein the BMS is configured to control the switching circuit so as to connect the plurality of battery modules in parallel in a module balancing mode to charge the plurality of battery modules with the power applied from the external device until a voltage difference among the plurality of battery modules is a predetermined reference value or less,
wherein each of the plurality of battery modules includes a voltage unit configured to measure a voltage of the respective battery module and transmit the measured voltage to the BMS, and
wherein the voltage unit is located between a respective first switch of the plurality of first parallel switches and a respective second switch of the plurality of second parallel switches of each battery module.

2. The battery system of claim 1, wherein:
the switching circuit includes:
a serial switch connected between an anode of a predetermined battery module among the plurality of battery modules and a cathode of another battery module among the plurality of battery modules adjacent to the predetermined battery module,
a first main relay connected between a first contact point and a first output terminal to which second ends of the plurality of first parallel switches are connected,
a balancing relay connected between a second contact point and a second output terminal to which second ends of the plurality of second parallel switches are connected, and
a second main relay connected between a cathode of the battery pack and the second output terminal.

3. The battery system of claim 2, wherein:
the BMS, in the discharge mode and in the charge mode,
turns on the serial switch, and turns off the plurality of first parallel switches and the plurality of second parallel switches to connect the plurality of battery modules in series, and
turns on the first main relay and the second main relay, and turns off the balancing relay to electrically connect the plurality of battery modules connected in series and the external device.

4. The battery system of claim 2, wherein:
the BMS, in the module balancing mode,
turns off the serial switch, and turns on the plurality of first parallel switches and the plurality of second parallel switches to connect the plurality of battery modules in parallel, and
turns on the first main relay and the balancing relay, and turns off the second main relay to electrically connect the plurality of battery modules connected in parallel and the external device.

5. The battery system of claim 4, wherein:
the BMS, when the voltage difference among the plurality of battery modules is lowered to the predetermined reference value or less by changing by the external device,
electrically isolates the plurality of battery modules connected in parallel and the external device, and controls the switching circuit so that a connection of the plurality of battery modules is changed from a parallel connection to a serial connection.

6. The battery system of claim 2, further comprising a voltage sensor connected between the first main relay and the balancing relay.

7. The battery system of claim 6, wherein a first end of the voltage sensor is located in between the first main relay and a first parallel switch of the plurality of first parallel switches, and a second end of the voltage sensor is located between the balancing relay and a second parallel switch of the plurality of second parallel switches.

8. The battery system of claim 1, wherein:
the external device,
includes a power conversion system (PCS) adjusting a power amount supplied according to a control of the BMS.

9. The battery system of claim 1, wherein the BMS is directly connected to the battery pack.

10. A method of voltage balancing among a plurality of battery modules connected in series in a discharge mode to supply power from a battery pack to an external device and in a charge mode to receive the power from the external device to charge the battery pack, the plurality of battery modules being connected to a plurality of first parallel switches including a first end connected to an anode of the plurality of battery modules and a plurality of second parallel switches including a first end connected to a cathode of the plurality of battery modules, the method comprising:
judging whether an entrance condition of a module balancing mode of voltage balancing among the plurality of battery modules is satisfied;
controlling a switching circuit so as to connect the plurality of battery modules in parallel when the entrance condition is satisfied according to a judgement result;
electrically connecting the plurality of battery modules connected in parallel and the external device to charge the plurality of battery modules connected in parallel; and
terminating the module balancing mode when a voltage difference among the plurality of battery modules is lowered to a predetermined reference value or less by the charging,
wherein each of the plurality of battery modules includes a voltage unit configured to measure a voltage of the respective battery module and transmit the measured voltage to a BMS, and
wherein the voltage unit is located between a respective first switch of the plurality of first parallel switches and a respective second switch of the plurality of second parallel switches of each battery module.

11. The method of claim 10, wherein:
the entrance condition of the module balancing mode includes a case where a difference value between a maximum module voltage and a minimum module voltage among module voltages of the plurality of battery modules exceeds the predetermined reference value.

12. The method of claim 10, wherein:
in the controlling of the switching circuit so as to connect the plurality of battery modules in parallel,
the switching circuit is controlled to turn off a serial switch connected between an anode of a predetermined battery module among the plurality of battery modules and a cathode of another battery module among the plurality of battery modules adjacent to the predetermined battery module, and turn on the plurality of first parallel switches including the first end is connected to an anode of the plurality of battery modules and the plurality of second parallel switches including the first end connected to a cathode of the plurality of battery modules to connect the plurality of battery modules in parallel.

13. The method of claim 12, wherein:
in the charging of the plurality of battery modules connected in parallel,
the switching circuit is controlled to turn on a first main relay connected between a first contact point and a first output terminal to which second ends of the plurality of first parallel switches are connected and a balancing relay connected between a second contact point and a second output terminal to which second ends of the plurality of second parallel switches are connected, and turn off a second main relay connected between a cathode of the battery pack and the second output terminal to electrically connect the plurality of battery modules connected in parallel and the external device.

14. The method of claim 10, wherein:
in the terminating of the module balancing mode,
the switching circuit is controlled to electrically isolate the plurality of battery modules connected in parallel and the external device, and to change a connection of the plurality of battery modules from a parallel connection to a serial connection.

15. The method of claim 10, wherein:
in the terminating of the module balancing mode, when a difference value between a maximum module voltage and a minimum module voltage among module voltages of the plurality of battery modules is lowered to the predetermined reference value or less, the module balancing mode is terminated.

* * * * *